United States Patent
Sisco et al.

(10) Patent No.: US 8,676,850 B2
(45) Date of Patent: Mar. 18, 2014

(54) PRIORITIZATION MECHANISM FOR DELETION OF CHUNKS OF DEDUPLICATED DATA OBJECTS

(75) Inventors: Michael G Sisco, Vail, AZ (US); Yu Meng Li, Huilongguan (CN)

(73) Assignee: International Business Machines Corporation, Armonk, NY (US)

( * ) Notice: Subject to any disclaimer, the term of this patent is extended or adjusted under 35 U.S.C. 154(b) by 34 days.

(21) Appl. No.: 13/441,739

(22) Filed: Apr. 6, 2012

(65) Prior Publication Data
US 2013/0268498 A1    Oct. 10, 2013

(51) Int. Cl.
*G06F 17/30*    (2006.01)

(52) U.S. Cl.
USPC ............ 707/791; 707/802; 707/822; 707/828

(58) Field of Classification Search
USPC .................................................. 707/600–899
See application file for complete search history.

(56) References Cited

U.S. PATENT DOCUMENTS

| | | | |
|---|---|---|---|
| 7,870,105 B2 | 1/2011 | Arakawa et al. | |
| 7,984,022 B2 | 7/2011 | Cannon et al. | |
| 2009/0259701 A1 | 10/2009 | Wideman et al. | |
| 2009/0300321 A1 | 12/2009 | Balachandran et al. | |
| 2010/0064166 A1 | 3/2010 | Dubnicki et al. | |
| 2010/0082558 A1 | 4/2010 | Anglin et al. | |
| 2010/0223495 A1 | 9/2010 | Leppard | |
| 2010/0235332 A1 | 9/2010 | Haustein et al. | |
| 2011/0167096 A1 | 7/2011 | Guo et al. | |
| 2011/0225214 A1 | 9/2011 | Guo et al. | |
| 2011/0231374 A1 | 9/2011 | Jain et al. | |
| 2013/0046944 A1* | 2/2013 | Domyo et al. ................ | 711/162 |

OTHER PUBLICATIONS

Thwel et al., "An Efficient Indexing Mechanism for Data Deduplication", dated 2009, pp. 1-5.

Nam et al., "Reliability-Aware Deduplication Storage: Assuring Chunk Reliability and Chunk Loss Severity", dated 2011, pp. 1-6.

* cited by examiner

*Primary Examiner* — Isaac M Woo
(74) *Attorney, Agent, or Firm* — Rabindranath Dutta; Konrad, Raynes, Davda and Victor LLP

(57) ABSTRACT

A reference counter corresponding to a base chunk of a plurality of chunks of a deduplicated data object is maintained, where the reference counter is incremented in response to an insertion of any chunk that references the base chunk, and where the reference counter is decremented, in response to a deletion of any chunk that references the base chunk. A queue is defined for processing dereferenced chunks of the plurality of chunks. The dereferenced chunks in the queue are processed in a predefined order, to free storage space.

17 Claims, 9 Drawing Sheets

400

Deduplicated object layout on storage (Prior to deletion of data objects) ⎯ 402

| Object id | # of redundant chunks (linked) | # of base chunks (referenced) | Storage Volume ID |
|---|---|---|---|
| 100 | 50 | 0 | volume A |
| 200 | 1 | 99 | volume B |
| 300 | 20 | 10 | volume C |
| 400 | 5 | 40 | volume D |
| 500 | 5 | 50 | volume C |
| 600 | 10 | 10 | volume A |
| 700 | 15 | 7 | volume D |
| 800 | 65 | 10 | volume B |

Deduplicated object layout on storage (Pass #1) ⎯ 404

| Object id | # of redundant chunks (linked) | # of base chunks (referenced) | Storage Volume ID |
|---|---|---|---|
|  | 0 | 0 | volume A |
| 200 | 1 | 99 | volume B |
| 300 | 20 | 10 | volume C |
| 400 | 5 | 40 | volume D |
| 500 | 5 | 50 | volume C |
| 600 | 10 | 10 | volume A |
| 700 | 15 | 7 | volume D |
| 800 | 65 | 10 | volume B |

Deduplicated object layout on storage (Pass #2) ⎯ 406

| Object id | # of redundant chunks (linked) | # of base chunks (referenced) | Storage Volume ID |
|---|---|---|---|
|  | 0 | 0 | volume A |
|  | 0 | 0 | volume B |
| 300 | 20 | 10 | volume C |
| 400 | 5 | 40 | volume D |
| 500 | 5 | 50 | volume C |
| 600 | 10 | 10 | volume A |
| 700 | 15 | 7 | volume D |
| 800 | 65 | 10 | volume B |

Deduplicated object layout on storage (Prior to deletion of data objects) — 502

| Object id | # of redundant chunks (linked) | # of base chunks (referenced) | Storage Volume ID |
|---|---|---|---|
| 100 | 50 | 0 | volume A |
| 200 | 1 | 99 | volume B |
| 300 | 20 | 10 | volume C |
| 400 | 5 | 40 | volume D |
| 500 | 5 | 50 | volume C |
| 600 | 10 | 10 | volume A |
| 700 | 15 | 7 | volume D |
| 800 | 65 | 10 | volume B |

Deduplicated object layout on storage (Pass #1) — 504

| Object id | # of redundant chunks (linked) | # of base chunks (referenced) | Storage Volume ID |
|---|---|---|---|
|  | 50 | 0 | volume A |
|  | 1 | 99 | volume B |
|  | 20 | 10 | volume C |
|  | 5 | 40 | volume D |
|  | 5 | 50 | volume C |
|  | 10 | 10 | volume A |
|  | 15 | 7 | volume D |
|  | 65 | 10 | volume B |

Deduplicated object layout on storage (Pass #2) — 506

| Object id | # of redundant chunks (linked) | # of base chunks (referenced) | Storage Volume ID |
|---|---|---|---|
|  | 0 | 0 | volume A |
|  | 0 | 99 | volume B |
|  | 0 | 10 | volume C |
|  | 0 | 40 | volume D |
|  | 0 | 50 | volume C |
|  | 0 | 10 | volume A |
|  | 0 | 7 | volume D |
|  | 0 | 10 | volume B |

Deduplicated object layout on storage (Pass #3) — 508

| Object id | # of redundant chunks (linked) | # of base chunks (referenced) | Storage Volume ID |
|---|---|---|---|
|  | 0 | 0 | volume A |
|  | 0 | 99 | volume B |
|  | 0 | 10 | volume C |
|  | 0 | 40 | volume D |
|  | 0 | 50 | volume C |
|  | 0 | 0 | volume A |
|  | 0 | 7 | volume D |
|  |   | 10 | volume B |

Deduplicated object layout on storage (Pass #4) — 602

| Object id | # of redundant chunks (linked) | # of base chunks (referenced) | Storage Volume ID |
|---|---|---|---|
| Volume Empty | 0 | 0 | volume A |
| Volume Empty | 0 | 0 | volume B |
| | 0 | 10 | volume C |
| | 0 | 40 | volume D |
| | 0 | 50 | volume C |
| | 0 | 0 | volume A |
| | 0 | 7 | volume D |
| | | | volume B |

Deduplicated object layout on storage (Pass #5) — 604

| Object id | # of redundant chunks (linked) | # of base chunks (referenced) | Storage Volume ID |
|---|---|---|---|
| Volume Empty | 0 | 0 | volume A |
| Volume Empty | 0 | 0 | volume B |
| Volume Empty | 0 | 0 | volume C |
| | 0 | 40 | volume D |
| | 0 | 0 | volume C |
| | 0 | 0 | volume A |
| | 0 | 7 | volume D |
| | | | |

Deduplicated object layout on storage (Pass #6) — 606

| Object id | # of redundant chunks (linked) | # of base chunks (referenced) | Storage Volume ID |
|---|---|---|---|
| Volume Empty | 0 | 0 | volume A |
| Volume Empty | 0 | 0 | volume B |
| Volume Empty | 0 | 0 | volume C |
| Volume Empty | 0 | 0 | volume D |
| | 0 | 0 | volume C |
| | 0 | 0 | volume A |
| | 0 | 0 | volume D |
| | | | |

FIG. 6

PRIORITIZATION MECHANISM FOR DELETION OF CHUNKS OF DEDUPLICATED DATA OBJECTS

BACKGROUND

1. Field

The disclosure relates to a method, system, and article of manufacture for a prioritization mechanism for deletion of chunks of deduplicated data objects.

2. Background

Data deduplication is a technique for eliminating redundant data. In a deduplication process, chunks of data are identified and stored during a process of analysis, where the chunks of data are byte patterns. As the analysis continues, other chunks are compared to the stored chunks and whenever a match occurs, the redundant chunk is replaced with a reference that points to a stored chunk. In certain situations the same byte pattern may occur numerous times, and the amount of data to be stored may be greatly reduced by replacing redundant chunks with references that point to at least one unique chunk.

In a deduplication process, a deduplicated data object is broken into many unique chunks. The unique chunks are linked to other base chunks, if the unique chunks are redundant. Otherwise, the unique chunks are stored with associated storage as the unique chunks may become a base chunk.

SUMMARY OF THE PREFERRED EMBODIMENTS

Provided are a method, a system, a computer program in which a reference counter corresponding to a base chunk of a plurality of chunks of a deduplicated data object is maintained, wherein the reference counter is incremented in response to an insertion of any chunk that references the base chunk, and wherein the reference counter is decremented, in response to a deletion of any chunk that references the base chunk. A queue is defined for processing dereferenced chunks of the plurality of chunks. The dereferenced chunks in the queue are processed in a predefined order, to free storage space.

In further embodiments, the processing of the dereferenced chunks in the queue in the predefined order further comprises determining all linked chunks in the queue, deleting all the linked chunks in the queue and then determining if at least one volume is emptied, in response to the deleting of the all the linked chunks. In response to determining that at least one volume is emptied, the at least one volume is returned to a storage handler.

In further embodiments, in response to determining that at least one volume is not emptied, all base chunks with a reference count of zero are selected, and all the base chunks are sorted by volume. All base chunks on a selected volume are deleted. A determination is made as to whether the selected volume is emptied. In response to determining that the selected volume is emptied, the selected volume is returned to the storage handler.

In further embodiments, in response to determining that the selected volume is not emptied, a determination is made as to whether all base chunks with a reference count equal to zero has been processed. In response to determining that all base chunks with a reference count equal to zero has not been processed, all base chunks that are stored in another selected volume are deleted. In response to determining that the another selected volume is emptied, the another selected volume is returned to the storage handler.

In further embodiments, base chunks with a lower reference counts are processed prior to processing base chunks with a higher reference count.

In certain embodiments, the predefined order causes processing of all base chunks with a reference counter value of zero that are to be found in a single volume before processing of other base chunks of other volumes.

In further embodiments, deduplication services are provided by a computational device over a network.

BRIEF DESCRIPTION OF THE DRAWINGS

Referring now to the drawings in which like reference numbers represent corresponding parts throughout:

FIG. 4 illustrates a block diagram that shows chunk processing in a random order, in accordance with certain embodiments;

FIG. 5 illustrates a block diagram that shows chunk processing in a prioritized order in accordance with certain embodiments;

FIG. 6 illustrates a block diagram that shows further chunk processing in a prioritized order, in accordance with certain embodiments;

DETAILED DESCRIPTION

In the following description, reference is made to the accompanying drawings which form a part hereof and which illustrate several embodiments. It is understood that other embodiments may be utilized and structural and operational changes may be made.

Certain embodiments provide a prioritization mechanism on the basis of which chunks of deduplicated data are deleted. The prioritization mechanism allows faster reclamation of storage space in comparison to a random deletion of chunks of deduplicated data.

Deletion of Chunks of Deduplicated Data

If a deduplicated data object is deleted, or physically moved, unique chunks of, the deduplicated data object have to be processed such that determinations can be made on how to reconcile the storage allocations. If a unique chunk is redundant, the target chunk containing the actual storage may be dereferenced to allow for that storage to be reclaimed, if no more dependencies exist. If the unique chunk is serving as a base chunk, checks may be made to ensure that storage is not reclaimed if dependencies exist. The result of this processing phase is that a large amount of overhead may be incurred within the application. Additionally, there may be delays in reclaiming volumes of storage.

Since the overall goal of a deduplicated environment is to free up storage space, usually in the form of a volume, certain embodiments provide a prioritization to ensure an efficient deletion process for chunks. Without this model, the processing of unique chunks may take an excessive amount of time and incur huge amounts of processing overhead within the deduplication engine with long delays in returning storage volumes back to a storage handler.

Certain embodiments provide a prioritization mechanism such that all assigned unique chunks to a data object, including base chunks, are processed in an order which will allow for an optimal volume space reclamation. Since the unique chunks can only be attempted for removal after the owning object is deleted/moved, the unique chunks can be queued to a background process so that further analysis can be performed to determine an order of processing. This may allow for the inventory data object to be processed as appropriate (i.e., moved/deleted) and the assigned unique chunks may be deferred for post processing.

Exemplary Embodiments

Figure 1:
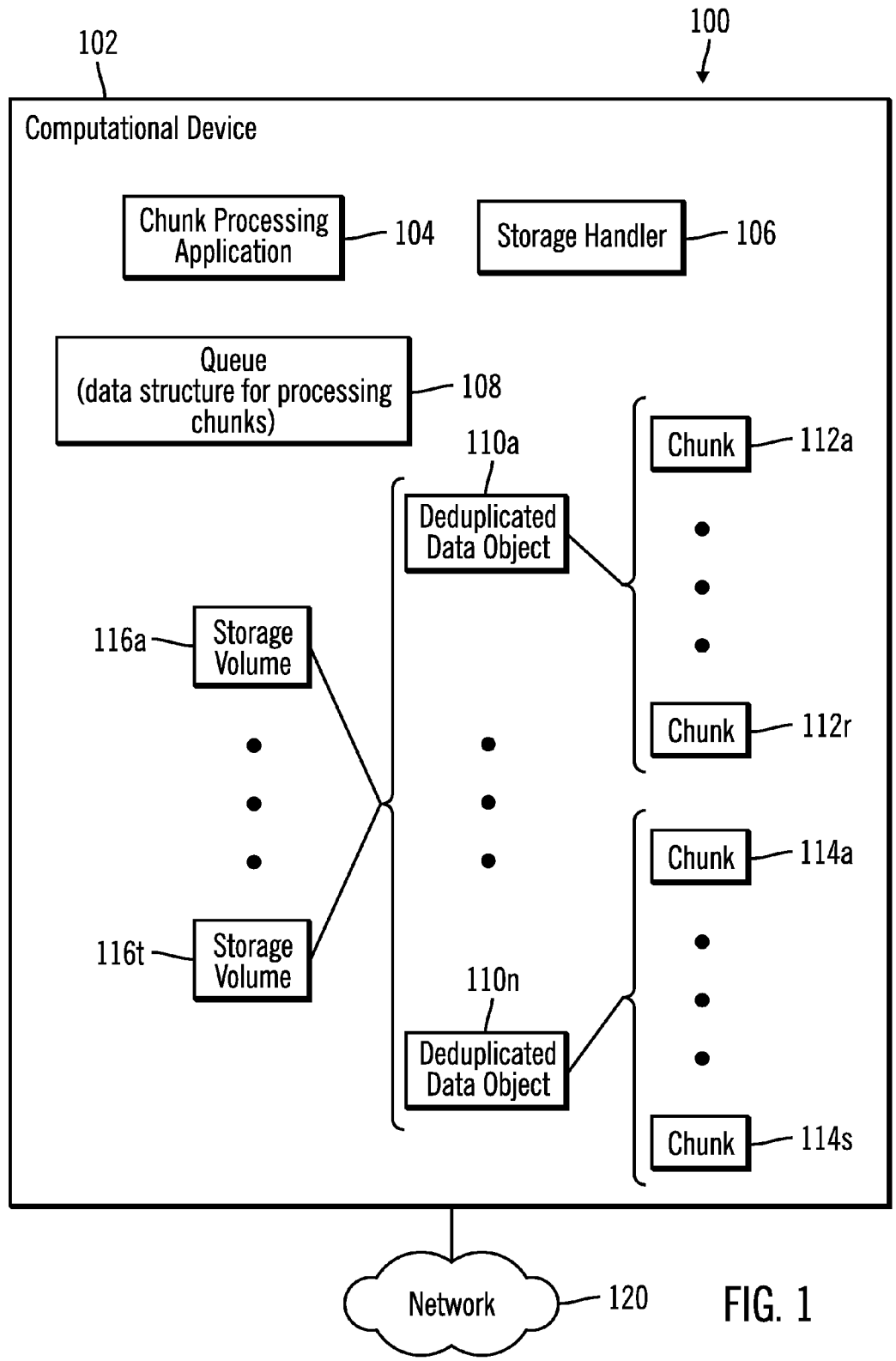
FIG. 1 illustrates a block diagram of a computing environment that includes a computational device that includes a chunk processing application, a storage handler, and a queue for processing chunks, in accordance with certain embodiments.

FIG. 1 illustrates a block diagram of a computing environment 100 that includes a computational device 102 that includes a chunk processing application 104, a storage handler 106, and a queue 108 for processing chunks, in accordance with certain embodiments.

The computational device 102 may comprise any suitable computational device including those presently known in the art, such as, a personal computer, a workstation, a server, a mainframe, a hand held computer, a palm top computer, a telephony device, a network appliance, a blade computer, a server, etc. The chunk processing application 104 and the storage handler 106 may comprise any suitable applications that execute in the computational device 102. The chunk processing application 104 processes chunks that are added to the queue 108 as a result of data movement or deletion. The storage handler 106 handles processing of storage volumes controlled by the computational device 102.

The computational device 102 may maintain data structures corresponding to a plurality of deduplicated data objects 110a . . . 110n, where each deduplicated data object may be comprised of a plurality of chunks, such as exemplary chunks 112a . . . 112r, 114a . . . 114s. The exemplary chunks 112a . . . 112r, 114a . . . 114s may comprise base chunks and other chunks that are distributed among a plurality of storage volumes 116a . . . 116t.

In certain embodiments the computational device 102 may be coupled to a network 120, and the computational device 102 may provide software services or other services in the form of deduplication services over the network 120 to other computational devices that may be coupled to the network 120.

Figure 2:
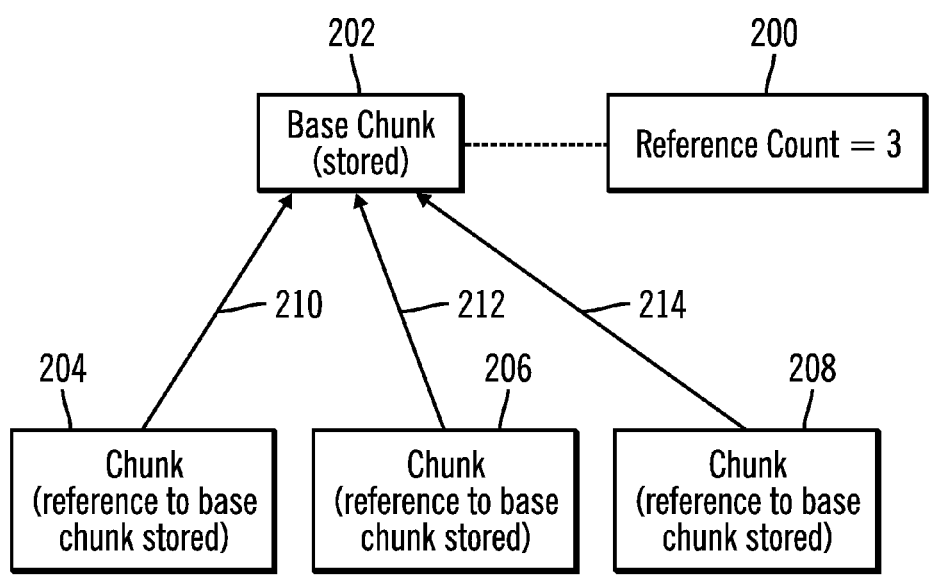
FIG. 2 illustrates a block diagram that shows a reference counter associated with a base chunk, in accordance with certain embodiments.

FIG. 2 illustrates a block diagram that shows a reference counter 200 associated with a base chunk 200, in accordance with certain embodiments. In FIG. 2, the three chunks 204, 206, 208 all reference the base chunk 202 via references or pointers 210, 212, 214 because the chunks 204, 206, 208 are duplicates of the base chunk 202. The base chunk 202 and the pointers 210, 212, 214 are stored in the computational device 102. As a result, a data object that comprises the base chunk 202, and the chunks 204, 206, 208 undergoes deduplication.

The reference counter 200 is associated to each base chunk such that any reference/dereference activity is recorded. This can be implemented via a mechanism such as a database trigger, such that any insert/delete may automatically update the count of the reference counter The reference counter 200 may be maintained by the chunk processing application 104.

Figure 3:
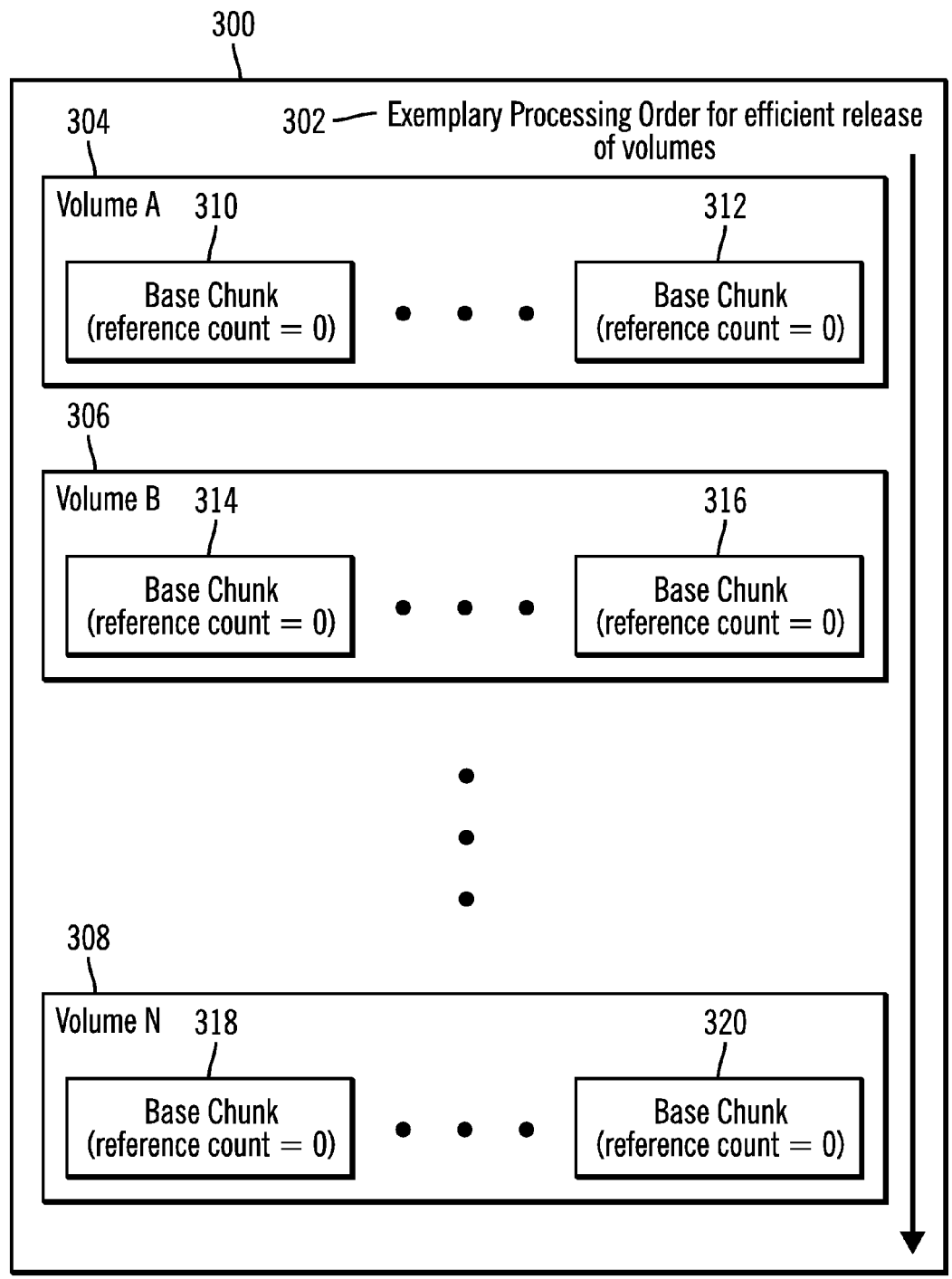
FIG. 3 illustrates a block diagram that shows an exemplary processing order of base chunks for efficient release of volumes, in accordance with certain embodiments.

FIG. 3 illustrates a block diagram 300 that shows an exemplary processing order 302 of base chunks for efficient release of volumes, in accordance with certain embodiments.

FIG. 3 shows a plurality of volumes 304, 306, 308 each having a plurality of base chunks 310, 312, 314, 316, 318, 320, where each base chunk has a reference count of zero. When a base chunk has a reference count of zero the base chunk can be deleted if it is no longer needed. In such exemplary embodiments, first all base chunks 310, 312 of volume A 304 may be processed and volume A 304 may be returned expeditiously to the storage handler 106 to free up space. If all the base chunks 310, 312, 314, 316, 318 were processed in a random order, then it might take longer for any volume to be released. For example, if base chunks 310 and 314 were processed first then neither volume A 304 nor volume B 306 may be freed.

FIG. 4 illustrates a block diagram 400 that shows chunk processing in a random order, in accordance with certain embodiments. Block 402 shows that eight objects are on 4 different volumes A, B, C, D prior to deletion of data objects. The number of linked chunks and the number of base chunks are also shown for each data object in block 402.

As shown in the sequence 404, 406, if all objects are deleted at the same time, and each is handled serially, the first volume may not be emptied until all of the data objects are processed, dependent on how the chunks are linked. The earliest point in which a storage volume may be deallocated may be after the 5th pass (object "500") after 280 chunks have been processed. It may take a total of 8 passes to de-allocate storage volumes A-D as shown above. This is extremely time consuming and may not be desirable in certain situations.

FIGS. 5 and 6 illustrate block diagrams 500, 600 that shows chunk processing in a prioritized order in accordance with certain embodiments. Block 502 shows that eight objects are on 4 different volumes A, B, C, D prior to deletion of data objects By using a prioritization method shown in FIGS. 5, 6, the data objects ("100-800") may be processed within pass #1 504 resulting in all of the associated chunks to be queued for background processing. Pass #2 506 may then involve the deletion of all 171 linked chunks. Pass #3 508 may then involve the deletion of 10 base chunks residing on volume A resulting in that volume being deallocated and returned to the storage handler 106r. Each subsequent volume may then be emptied on each follow-on pass since volume B would be processed, followed by C and so on so forth. In a total of 6 passes 504, 506, 508, 602, 604, 606, the entire list of storage volumes (A-D) may be deallocated with the first one coming on pass #3. Therefore storage volumes may be released much faster in comparison via prioritized processing of chunks in comparison to a random processing of chunks.

Figure 7:
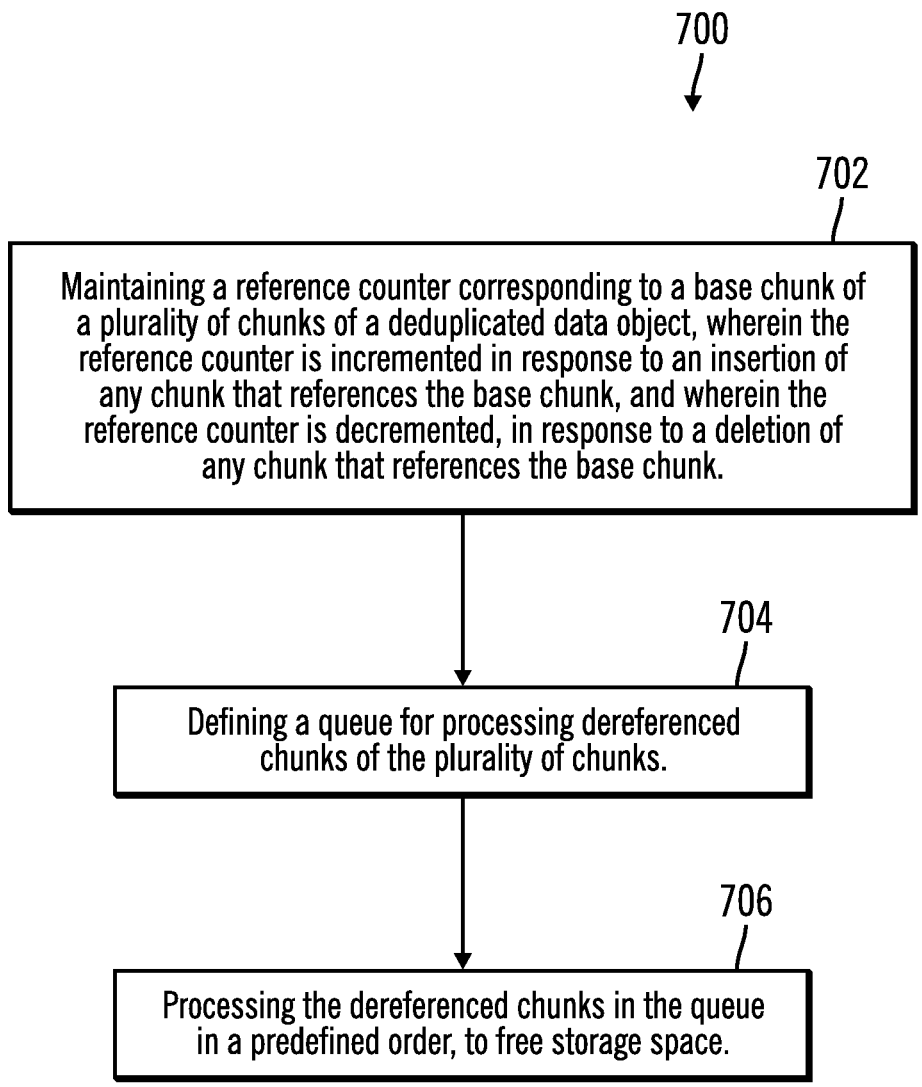
FIG. 7 illustrates first flowchart that shows chunk processing in a predefined order, in accordance with certain embodiments.

FIG. 7 illustrates shows a first flowchart 700 that shows chunk processing in a predefined order, in accordance with certain embodiments. The operations shown in FIG. 7 may be performed by the chunk processing application 104 that executes in the computational device 102.

Control starts at block 702 in which a reference counter 200 corresponding to a base chunk 202 of a plurality of chunks of a deduplicated data object is maintained, wherein the reference counter is incremented in response to an insertion of any chunk that references the base chunk, and wherein the reference counter is decremented, in response to a deletion of any chunk that references the base chunk. It may be noted that unless the reference counter is zero a base chunk cannot be deleted as other chunks may be pointing to the base chunk.

Control proceeds to block 704 in which a queue 108 is defined for processing dereferenced chunks of the plurality of chunks. Dereferenced chunks are those chunks that may potentially be deleted if no other chunks are pointing to the chunks. The dereferenced chunks may no longer be used by an application. In certain embodiments, the dereferenced chunks in the queue 108 are processed (at block 706) in a predefined order, to free storage space. The predefined order may be implemented within the logic of the chunk processing application 104. In certain embodiments, many different predefined orders in which the dereferenced chunks may potentially be processed may be implemented via the chunk processing application 104. In certain embodiments, a user, an administrator, or an automated program may select one or more of the many predefined orders implemented via the chunk processing application 104, and dereferenced chunks may be processed in accordance with the selections made by the user, the administrator, or the automated program. For example, one selected predefined order may process base chunks with lower reference counts prior to processing base chunks with higher reference count, and another selected predefined order may process all base chunks with a reference counter value of zero that are to be found in a single volume before processing other base chunks of other volumes.

Figure 8:
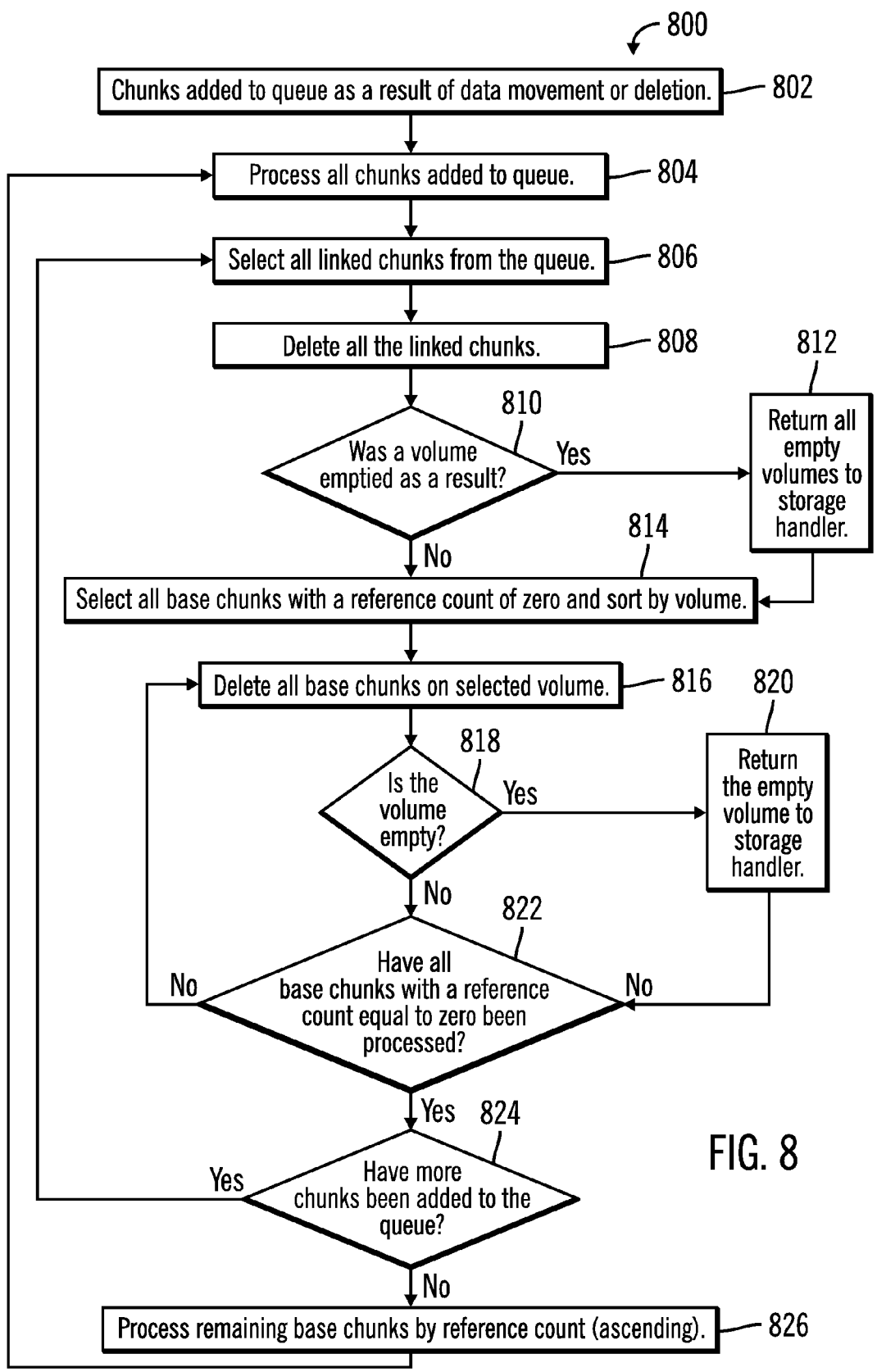
FIG. 8 illustrates a second flowchart that shows chunk processing in a predefined order, in accordance with certain embodiments.

FIG. 8 illustrates second flowchart 800 that shows chunk processing in a predefined order, in accordance with certain embodiments. The operations shown in FIG. 8 may be performed by the chunk processing application 104 that executes in the computational device 102.

Control starts at block 802 in which chunks are added to the queue 108 as a result of data movement or deletions. The chunk processing application 104 initiates (at block 804) the processing of all chunks added to the queue 108. A determination is made (at block 806) of all linked chunks in the queue 108 and all the linked chunks in the queue 108 are deleted (at block 808).

Control proceeds to block 810 in which the chunk processing application 104 determines if at least one volume is emptied, in response to the deleting of the all the linked chunks. In response to determining that at least one volume is emptied ("Yes" branch from block 810), the at least one volume is returned (at block 812) to a storage handler 106 and storage space is freed.

In further embodiments, in response to determining (at block 810) that at least one volume is not emptied, all base chunks with a reference count of zero are selected (at block 814) and all the base chunks are sorted by volume. For example, FIG. 3 shows as exemplary sorting of base chunks into volumes. All base chunks on a selected volume are deleted (at block 816). A determination is made as to whether the selected volume is emptied (at block 818). In response to determining that the selected volume is emptied ("Yes" branch from block 818), the selected volume is returned (at block 820) to the storage handler 106 and storage space is freed.

In further embodiments, in response to determining that the selected volume is not emptied ("No" branch from block 818), a determination is made (at block 822) as to whether all base chunks with a reference count equal to zero has been processed. In response to determining that all base chunks with a reference count equal to zero has not been processed, all base chunks that are stored in another selected volume are deleted by returning control to block 816. In response to determining that the another selected volume is emptied, the another selected volume is returned to the storage handler 106.

If at block 822 a determination is made that all base chunks with a reference count equal to zero have been processed, then a determination is made (at block 824) as to whether more chunks have been added to the queue 108. If so control returns to block 806, and if not control proceeds to block 826 in which remaining base chunks with a lower reference counts are processed prior to processing base chunks with a higher reference count, and control returns to block 804. The prioritized processing of base chunks with a lower reference count makes it more likely that space will be released sooner.

Therefore FIGS. 1-8 illustrate certain embodiments for prioritization while processing chunks. A reference counter is associated with each base chunk. A queue is defined such that all dereferenced chunks can be inserted and aggregated based on a boundary of choice, such as time or transactional parameters, etc. The queue of moved or deleted chunks may in certain embodiments be processed in the following order:

(a) All linked chunks in the queue may be processed first, irregardless of volume ordering;
(b) Emptied volumes can be deleted from, or returned to, the storage handler 106 for reuse;
(c) All base chunks with a reference count of zero may then be processed, ordered by volume;
(d) Emptied volumes may be deleted or returned for reuse; and
(e) A check for more queued chunks may be performed. If new chunks are found then operations (a) and (b) are repeated. If no new chunks are found, base chunks with lowest reference counts may be processed followed by chunks with higher reference counts.

Additional Embodiment Details

The described operations may be implemented as a method, apparatus or computer program product using standard programming and/or engineering techniques to produce software, firmware, hardware, or any combination thereof. Accordingly, aspects of the embodiments may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the embodiments may take the form of a computer program product embodied in one or more computer readable medium(s) having computer readable program code embodied there.

Any combination of one or more computer readable medium(s) may be utilized.

The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java*, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

*Java is a trademark or registered trademark of Oracle and/or its affiliates.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 9:
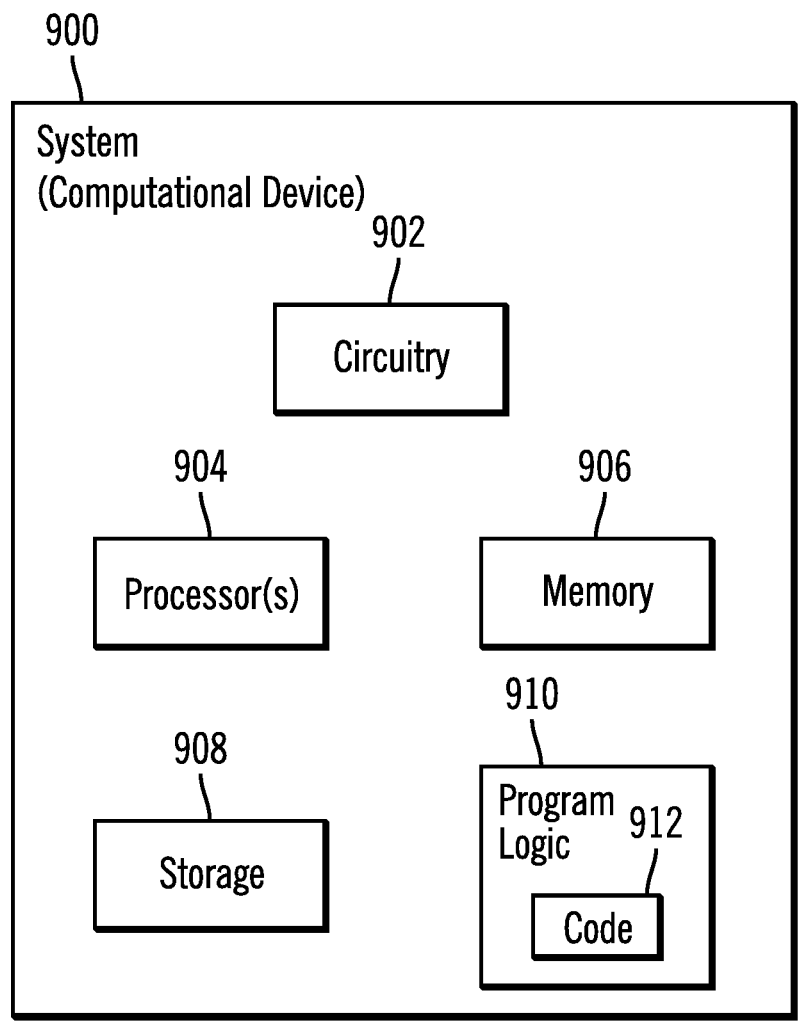
FIG. 9 illustrates a block diagram of a computational system that shows certain elements that may be included in at least the computational device of FIG. 1, in accordance with certain embodiments.

FIG. 9 illustrates a block diagram that shows certain elements that may be included in the computational device 102, in accordance with certain embodiments. The system 900 may comprise the computational device 102, and may include a circuitry 902 that may in certain embodiments include at least a processor 904. The system 900 may also include a memory 906 (e.g., a volatile memory device), and storage 908. The storage 908 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 908 may comprise an internal storage device, an attached storage device and/or a network accessible storage device. The system 900 may include a program logic 910 including code 912 that may be loaded into the memory 906 and executed by the processor 904 or circuitry 902. In certain embodiments, the program logic 910 including code 912 may be stored in the storage 908. In certain other embodiments, the program logic 910 may be implemented in the circuitry 902. Therefore, while FIG. 9 shows the program logic 910 separately from the other elements, the program logic 910 may be implemented in the memory 906 and/or the circuitry 902.

Certain embodiments may be directed to a method for deploying computing instruction by a person or automated processing integrating computer-readable code into a computing system, wherein the code in combination with the computing system is enabled to perform the operations of the described embodiments.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

At least certain operations that may have been illustrated in the figures show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method, comprising:
   maintaining, via computational device, a reference counter corresponding to a base chunk of a plurality of chunks of a deduplicated data object, wherein the reference counter is incremented in response to an insertion of any chunk that references the base chunk, and wherein the reference counter is decremented, in response to a deletion of any chunk that references the base chunk;
   defining a queue for processing dereferenced chunks of the plurality of chunks; and
   processing the dereferenced chunks in the queue in a predefined order, to free storage space, wherein the processing of the dereferenced chunks in the queue in the predefined order comprises: determining all linked chunks in the queue; deleting all the linked chunks in the queue; determining if at least one volume is emptied, in response to the deleting of the all the linked chunks; and in response to determining that at least one volume is emptied, returning the at least one volume to a storage handler.

2. The method of claim 1, wherein the processing of the dereferenced chunks in the queue in the predefined order further comprises:
   in response to determining that at least one volume is not emptied, selecting all base chunks with a reference count of zero and sorting all the base chunks by volume;
   deleting all base chunks on a selected volume;
   determine whether the selected volume is emptied; and
   in response to determining that the selected volume is emptied, returning the selected volume to the storage handler.

3. The method of claim 2, wherein the processing of the dereferenced chunks in the queue in the predefined order further comprises:
   in response to determining that the selected volume is not emptied, determining whether all base chunks with a reference count equal to zero has been processed;
   in response to determining that all base chunks with a reference count equal to zero has not been processed, deleting all base chunks that are stored in another selected volume; and
   in response to determining that the another selected volume is emptied, returning the another selected volume to the storage handler.

4. The method of claim 1, the method further comprising:
   processing base chunks with lower reference counts prior to processing base chunks with higher reference counts.

5. The method of claim 1, wherein the predefined order causes processing of all base chunks with a reference counter value of zero that are to be found in a single volume before processing of other base chunks of other volumes.

6. The method of claim 1, wherein deduplication services are provided by the computational device over a network.

7. A system, comprising:
   a memory; and
   a processor coupled to the memory, wherein the processor performs operations, the operations comprising:
   maintaining a reference counter corresponding to a base chunk of a plurality of chunks of a deduplicated data object, wherein the reference counter is incremented in response to an insertion of any chunk that references the base chunk, and wherein the reference counter is decremented, in response to a deletion of any chunk that references the base chunk;
   defining a queue for processing dereferenced chunks of the plurality of chunks; and
   processing the dereferenced chunks in the queue in a predefined order, to free storage space, wherein the processing of the dereferenced chunks in the queue in the predefined order comprises: determining all linked chunks in the queue; deleting all the linked chunks in the queue; determining if at least one volume is emptied, in response to the deleting of the all the linked chunks; and in response to determining that at least one volume is emptied, returning the at least one volume to a storage handler.

8. The system of claim 7, wherein the processing of the dereferenced chunks in the queue in the predefined order further comprises:
   in response to determining that at least one volume is not emptied, selecting all base chunks with a reference count of zero and sorting all the base chunks by volume;
   deleting all base chunks on a selected volume;
   determine whether the selected volume is emptied; and
   in response to determining that the selected volume is emptied, returning the selected volume to the storage handler.

9. The system of claim 8, wherein the processing of the dereferenced chunks in the queue in the predefined order further comprises:
   in response to determining that the selected volume is not emptied, determining whether all base chunks with a reference count equal to zero has been processed;
   in response to determining that all base chunks with a reference count equal to zero has not been processed, deleting all base chunks that are stored in another selected volume; and in response to determining that the another selected volume is emptied, returning the another selected volume to the storage handler.

10. The system of claim 7, the method further comprising: processing base chunks with lower reference counts prior to processing base chunks with higher reference counts.

11. The system of claim 7, wherein the predefined order causes processing of all base chunks with a reference counter value of zero that are to be found in a single volume before processing of other base chunks of other volumes.

12. The system of claim 7, wherein deduplication services are provided by a computational device over a network.

13. A computer program product, the computer program product comprising
a computer readable storage medium having computer readable program code embodied therewith, the computer readable program code configured to perform operations, the operations comprising:
maintaining a reference counter corresponding to a base chunk of a plurality of chunks of a deduplicated data object, wherein the reference counter is incremented in response to an insertion of any chunk that references the base chunk, and wherein the reference counter is decremented, in response to a deletion of any chunk that references the base chunk;
defining a queue for processing dereferenced chunks of the plurality of chunks; and
processing the dereferenced chunks in the queue in a predefined order, to free storage space, wherein the processing of the dereferenced chunks in the queue in the predefined order comprises: determining all linked chunks in the queue; deleting all the linked chunks in the queue; determining if at least one volume is emptied, in response to the deleting of the all the linked chunks; and in response to determining that at least one volume is emptied, returning the at least one volume to a storage handler.

14. The computer program product of claim 13, wherein the processing of the dereferenced chunks in the queue in the predefined order further comprises:
in response to determining that at least one volume is not emptied, selecting all base chunks with a reference count of zero and sorting all the base chunks by volume;
deleting all base chunks on a selected volume;
determine whether the selected volume is emptied; and
in response to determining that the selected volume is emptied, returning the selected volume to the storage handler.

15. The computer program product of claim 14, wherein the processing of the dereferenced chunks in the queue in the predefined order further comprises:
in response to determining that the selected volume is not emptied, determining whether all base chunks with a reference count equal to zero has been processed;
in response to determining that all base chunks with a reference count equal to zero has not been processed, deleting all base chunks that are stored in another selected volume; and
in response to determining that the another selected volume is emptied, returning the another selected volume to the storage handler.

16. The computer program product of claim 13, the method further comprising:
processing base chunks with lower reference counts prior to processing base chunks with higher reference counts.

17. The computer program product of claim 13, wherein the predefined order causes processing of all base chunks with a reference counter value of zero that are to be found in a single volume before processing of other base chunks of other volumes.

* * * * *